United States Patent
Sharma et al.

(10) Patent No.: US 12,417,250 B1
(45) Date of Patent: Sep. 16, 2025

(54) PROCESSING USER INPUT TO A COMPUTING ENVIRONMENT USING ARTIFICIAL INTELLIGENCE

(71) Applicant: Morgan Stanley Services Group Inc., New York, NY (US)

(72) Inventors: Girish C. Sharma, Pennington, NJ (US); Kiran A. Karkhanis, Hillsborough, NJ (US); Biswaranjan Panigrahi, Bangalore (IN); Angad Sangha, Bangalore (IN); Sahaj Adlakha, Bangalore (IN); Manish Reddy, Bangalore (IN); Mugdha Deshpande, Cumming, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/093,177

(22) Filed: Mar. 27, 2025

(51) Int. Cl.
| | |
|---|---|
| *G06F 16/903* | (2019.01) |
| *G06F 16/93* | (2019.01) |
| *G06F 40/30* | (2020.01) |
| *G06F 40/40* | (2020.01) |

(52) U.S. Cl.
CPC ........ *G06F 16/90335* (2019.01); *G06F 16/93* (2019.01); *G06F 40/30* (2020.01); *G06F 40/40* (2020.01)

(58) Field of Classification Search
CPC .... G06F 16/90335; G06F 16/93; G06F 40/30; G06F 40/40
USPC .......................................................... 707/770
See application file for complete search history.

(56) References Cited

U.S. PATENT DOCUMENTS

| | | |
|---|---|---|
| 11,928,569 B1 | 3/2024 | Douthit |
| 12,014,634 B1 | 6/2024 | Nair et al. |
| 12,061,970 B1 | 8/2024 | Lo et al. |
| 2024/0111498 A1 | 4/2024 | Vaughn |
| 2024/0160902 A1* | 5/2024 | Padgett ............... G06N 3/0895 |

(Continued)

FOREIGN PATENT DOCUMENTS

| | | | |
|---|---|---|---|
| WO | WO-2025054413 A1 * | 3/2025 | |
| WO | WO-2025064877 A1 * | 3/2025 | |

OTHER PUBLICATIONS

"GitHub Copilot", Microsoft, Retrieved: Mar. 27, 2025, https://github.com/features/copilot, 12 pages.

(Continued)

*Primary Examiner* — Michael Pham
(74) *Attorney, Agent, or Firm* — Duane Morris LLP

(57) ABSTRACT

A system or method for determining user request intent, and processing the request based upon the determined intent. The system or method includes receiving a user query from an interface, then determining and categorizing the intent of the user based on the query. The query can be reformatted or supplemented. If the intent is information, the query is provided to a Gen AI server—its response is then provided back. If the intent is transaction, the query is also sent to the Gen AI server—however, the response is an instruction set for the system, which executes the instruction set, and provides the subsequent response from the execution point back. If the intent is an action, the system verifies the user has proper access rights to request the action, before executing an instruction set and providing the subsequent response back, like in the instructional intent.

20 Claims, 11 Drawing Sheets

(56) References Cited

U.S. PATENT DOCUMENTS

| | | |
|---|---|---|
| 2024/0202225 A1 | 6/2024 | Siebel et al. |
| 2024/0202460 A1 | 6/2024 | Schillace et al. |
| 2024/0256948 A1 | 8/2024 | Betthauser et al. |
| 2024/0281621 A1 | 8/2024 | Janakiraman et al. |
| 2025/0068857 A1* | 2/2025 | Lakshmikanthan .... G06F 40/30 |

OTHER PUBLICATIONS

"Zoom's smart AI assistant that empowers you", Zoom, Retrieved: Mar. 27, 2025, https://www.zoom.com/en/products/ai-assistant/, 7 pages.

* cited by examiner

FIG. 6

Ask Questions

Lorem ipsum dolor sit amet, consectetur adipiscing elit. Aliquam ullamcorper congue est eu Q1 2024.

SELECT ID, DATE, COLUMN_1 as 'Column 1', Column_2 as 'Column_2' FROM IDInfo_tbl a INNER JOIN LoremIpsum_tbl b ON a.ID = b.RefID WHERE a.Date > 12-31-2024 AND a.Date < 4-1-2024

600

PROCESSING USER INPUT TO A COMPUTING ENVIRONMENT USING ARTIFICIAL INTELLIGENCE

TECHNICAL FIELD

The present disclosure relates to data retrieval and enhancement based on specific user queries; and more particularly, to returning information, transactional data, or process results in response to user input using artificial intelligence (AI).

BACKGROUND

Chat-based interfaces are an increasingly popular mechanism for interacting with complex computing systems. Commands written in colloquial language by non-technical users can be used to effect discrete and technical computer processes. In particular, a material benefit is obtained where users desire a particular outcome, but may not have the technical experience to produce, or even concisely describe, that desired outcome.

Generative Artificial Intelligence (Gen AI), and in particular large language models (LLMs) are able to facilitate the transformation of imprecise, spoken-style language into specific computer commands and instructions. These Gen AI tools expect prompts for transforming descriptive language into functional outcomes. However, it might be challenging for non-technical users to provide effective prompts. Determining the semantic intent or type of the user query reflective of the user intent would materially improve this process, as the category of the user query will drive more precise analysis of a user's requests from the Gen AI system.

Further, even for technical users, providing short hand instructions for complicated processes are of benefit from an efficiency perspective. Additionally, for both types of users, providing additional contextual information, which the users may not have readily available, to the Gen AI system would improve the quality of the responses to the user queries. As such, there are opportunities to address user query categorization and associated routing within computing systems and facilitate further query processing.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 6 illustrates an example screen of the software orchestration-by-intent system responding to a dissatisfaction statement from a user in a chat window with a survey.

DETAILED DESCRIPTION OF CERTAIN EMBODIMENTS

Figure 1A:
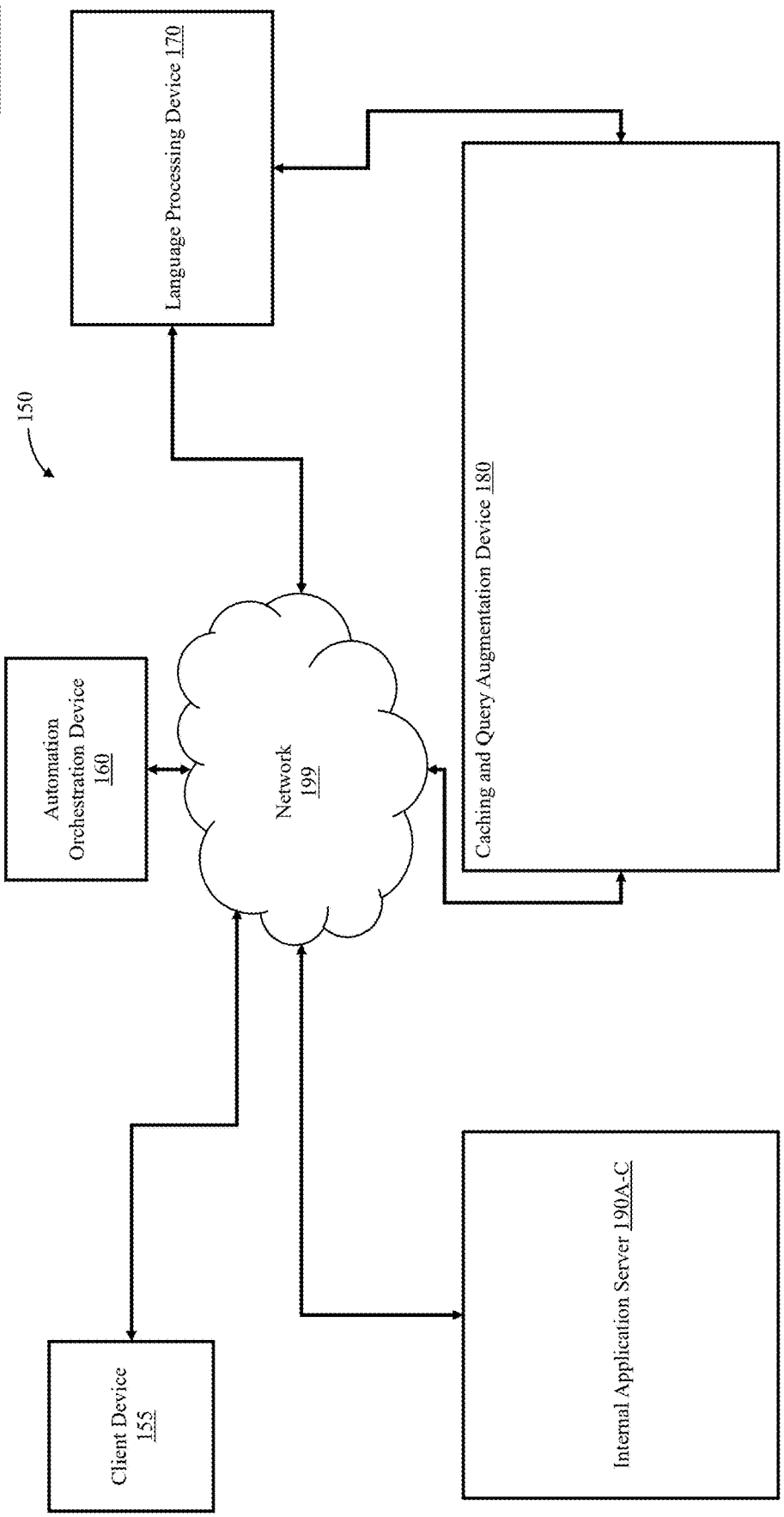
FIG. 1A illustrates an example networked system including an exemplar networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices may be shown in block diagram form in order to avoid unnecessarily obscuring the example embodiment(s).

1. General Overview

A system or method for classifying and processing user queries related to a computing environment using machine learning is disclosed. The system or method includes receiving a user query from an interface and categorizing the user query using large language models or other artificial intelligence techniques. The query can be reformatted or supplemented with user-specific or historical data and transformed into additional requests using artificial intelligence techniques. When the query type is information, the query is transformed for comparison with internal vector embeddings or existing knowledge of an external machine learning model in response the user query. When the query type is transaction, the query is transformed for read access to internal database management systems in response to the user query. When the query type is action, the query is transformed for changing the state of the computing environment in response to the user query.

The query can include information regarding access rights, or certain identifying information can be added to, associated with, or removed from the user query. The system or method can include receiving one or more intent identifiers within the user query. Intent identifiers are words, phrases, text, or vectors which are associated with one or more pre-determined user intent categories. Some examples of intent identifiers can include the names of software applications (e.g., "JIRA", "Slack", "Splunk"), verbs or verbal phrases related to actions software applications (including database applications) perform (e.g., "call", "talk", "create ticket"), noun or noun phrases related to software applications (e.g., "issue" "schema" "cell"), or any word, clause, constituent, phrase, sentence, or other grouping of words or symbols which convey meaning. The system or method can also include splitting the user query into two or more portions—one portion to be the only input into intent identification, while the other portion is to be the only input into post-intent-identification processes.

The system or method includes classifying the user query, and categorizing the query into a category. If categorized into an information type category, the system or method can encode the received user query into a vector, and perform a semantic search of a cache to determine whether that user query has been previously queried. If no result is found, the vectored user query can then be semantically searched against a vector database, to determine whether that user query has related relevant information stored in the database. The user query can then be enhanced with any related relevant information identified. The system or method next includes transmitting the user prompt (enhanced or otherwise) to a generative artificial intelligence (Gen AI) service. The system or method then includes returning a summary of the response from the Gen AI service.

The system or method, if the user query is categorized into a transaction type category, can reprocess the user query and further include addendum information. The system or method then invokes a transaction call to an internal application programming interface (API), the transaction call including the reprocessed user query and any addendum information. The internal API can be provided access rights associated with the user query. The system or method can receive a reply from the internal API, and then generate and present interactive content at the interface.

The system or method, if the user query is categorized into an action type category, perform an access capacity check, potentially checking the user access rights to perform a particular action. The system or method can then reprocess the user query and further include addendum information. The system or method then invokes an action call to an internal API, the action call including the reprocessed user query, addendum information and can include access rights of the user. The system or method then receives an action reply, and transmits the action reply to the interface.

The system and method disclosed herein has several technical benefits. The disclosed systems and methods increase efficiency of data processing and software interactions by permitting non-technical user queries in non-technical language to be efficiently transformed into interactions with computing servers and digital data. The system offers a streamlined process of transforming a natural-language query into additional actionable queries or requests based on the type of queries and specific context data, including documentation of internal APIs or database schemas or histories of prior query processing. The system further provides custom and concise prompts for LLMs or other advanced machine learning models, which reduces the maintenance effort while increasing the outcome coverage and quality. The system or method, by dividing the Gen AI communication process into an intent-derivation phase and an execution phase, simplifies the tasks of the Gen AI system in the execution phase by limiting the scope of the tasks and the types of responses to generate. The division of processing, including not only the intent-derivation phase but also the preemptive semantic search of a cache or an internal vector database, reduces the amount and complexity of the interactions with the Gen AI system-improving processing, network, and economic efficiency.

2. Example Computing Environments

FIG. 1A illustrates a distributed computing environment 150 that includes an automation orchestration device 160, a language processing device 170, multiple internal application servers 190A-C, a caching and query augmentation device 180, and a client device 155 communicatively coupled over a network 199 using one or more wired and/or wireless connections. Each of the automation orchestration device 160, language processing device 170, internal application servers 190A-C, caching and query augmentation device 180, and client device 155 can be, for example, a server, a laptop, a desktop computer, a tablet computer, or any other suitable computing device programmed to carry out the corresponding functions described herein.

The network 199 can be implemented by any medium or mechanism that provides for the exchange of data between the various components of FIG. 1A. Examples of the network 199 include, without limitation, one or more of a cellular network, a WiFi network, a near-field communication (NFC) network, a Local Area Network (LAN), a Wide Area Network (WAN), any Internet capable network, or any other suitable wired or wireless communication network.

The automation orchestration device 160 is configured (i.e., programmed) to receive queries from various computing devices, such as the client device 155. This programmed configuration is extended, modified to enable on demand change with additional end points and orchestration logic. Each query can be construed as an instruction or series of instructions to be executed. In an embodiment, the queries from the client device 155 are text-based, human-readable queries, preferably in a conversational format. For example, a query can include the text of "select all columns from the table 'user_tbl' joined with 'client_tbl' on their id columns" or the conversational question of "can you tell me about the users that are also clients?".

In some embodiments, the automation orchestration device 160 performs a query categorization process, to classify the query and further determine how to process the query. The intent of the query is also disclosed as a scope of the query. In some embodiments, the intent is divided among functional categories, which include categories based upon the ultimate function of the query, with intent categories including queries with an information-requesting intent, queries with a transaction-requesting intent, and queries with an action-requesting intent. In other embodiments, the intent is divided alternatively or additionally among processing categories, which include categories based upon the ultimate system, software application, or machine to be affected by the query, with intent categories assigned to general information queries, as well as other intent categories aligned to one or more internal application server 190A-C.

In some embodiments, the automation orchestration device 160 receives messages or data from the client device 155, language processing device 170, caching and query augmentation device 180, and internal application server 190A-C, and reformats or restructures sender messages into forms that are acceptable to recipient devices. For example, the automation orchestration device 160 can also add quotation marks, capitalize words or sentences, place responsive records into a table with markups for graphical display, load images at uniform resource identifiers (URLs) or reformat strings into objects such as a JavaScript Object Notation (JSON) Binary Large Object (BLOB). Automation orchestration device 160 can also add information, such as instructions to not transmit personally identifying information (PII)

or a user credential. Automation orchestration device 160 can also remove information from messages, again such as user credentials.

In some embodiments, the automation orchestration device 160 is configured to communicate with the language processing device 170 over the network 199. Alternatively, the language processing device 170 can be integrated into the automation orchestration device 160. The internal application servers 190A-C or the caching and query augmentation device 180 can also be integrated into the automation orchestration device 160. Alternatively, the automation orchestration device 160 can be programmed to enable the internal application servers 190A-C or the caching and query augmentation device 180 to perform internal, downstream query processing. Messages or requests received from and client device 155 over the network 199 can be routed through the automation orchestration device 160 for intra-processing and possible redirection.

The language processing device 170 can be configured to receive human-readable, text-based prompts, and return human-readable outputs. In some embodiments, the language processing device 170 is configured to perform Gen AI, and in further embodiments, the language processing device 170 is configured to train and execute an LLM. In the context of what prompts the language processing device 170 is capable of receiving and what outputs data the language processing device 170 is capable of returning, in some embodiments "human-readable" can include written natural language or written language with customized although conventionally incorrect spelling, grammar, or syntax. For example, certain chatbots communicate using a specific language using between one another, in order to efficiently convey programmatic information in a technically human-readable format. The language processing device 170 can communicate in a similar manner, and such communication would still qualify as "human-readable".

The language processing device 170 can also be programmed to receive queries or data from the caching and query augmentation device 180 directly or through the automation orchestration device 160, in a human-readable format or in a numerical or binary format, such as a vector embedding. The language processing device 170 can return output to the caching and query augmentation device 180, in a human-readable format or in a numerical or binary format, such as a vector embedding. For example, preparing a vector embedding of a file by the language processing device 170 for caching by the caching and query augmentation device 180 can be done asynchronously relative to the generation of the user query, or in response to some input other than the generation of a user query.

In some embodiments, the caching and query augmentation device 180 is programmed to manage a repository for prior conversations with the client device 155 managed by the automation orchestration device 160. This repository can be queried to return cached results for repetitive queries from the client device 155 which would result in repetitive answers from the language processing device 170, were the language processing device 170 to handle the query instead of the caching and query augmentation device 180. Additionally, in some embodiments the caching and query augmentation device 180 can be programmed to generate or store augmenting or enhancing information for the queries, which can be used to provide additional context or truths to the language processing device 170 as the language processing device 170 processes the user query. This additional context can be provided via a retrieval-augmented generation (RAG) process, where the augmenting or enhancing information can be indexed for use by the language processing device 170. Next, the indexed augmenting or enhancing information most relevant to the user query can be retrieved. The user query can then be re-structured to include the retrieved relevant augmenting or enhancing information. The re-structured user query is then provided to the language processing device. This is further discussed below, in particular in FIG. 2. For example, the caching and query augmentation device 180 can include pairings between internal organization acronyms likely referenced in the queries and their respective meanings: the language processing device 170, when operating as an external service, would generally not have the context for the private meaning of words, phrases, or acronyms internal to the organization associated with the automation orchestration device 160. As an alternative example, the caching and query augmentation device 180 can store or have access to data representing a table of U.S. Federal Reserve interest rates to which a query applies. Continuing the example, when the user query states "what was the fed rate three months ago", the language processing device 170 can interpret that to mean "Respond with the U.S. Federal Reserve Interest Rate as of Sep. 30, 2024". Going further, the data representing a table of U.S. Federal Reserve interest rates can be provided along with the user query, allowing the language processing device 170 to select the record from the table most closely related to Sep. 30, 2024. This approach can prevent the language processing device 170 from attempting to source that data from a public data feed or hallucinating (i.e., falsifying) data in an attempt to satisfy the user query.

Each of the internal application servers 190A-C is programmed to manage one or more applications associated with the automation orchestration device 160. These applications can be used to process or respond to user queries. In some embodiments, internal application servers 190A-C operate services which conventionally are not or are only partially enabled to interoperate with the language processing device 170. In some embodiments, internal application servers 190A-C can expose an application programming interface (API) for the automation orchestration device 160 to transmit and receive formatted messages over network 199. In other embodiments, internal application servers 190A-C can include a human-designed user interface, which would expect the automation orchestration device 160 to transmit keystrokes, mouse clicks, or touch screen touches to internal application servers 190A-C, and can copy or receive images, video, video feeds, or screen shots directly or indirectly from internal application servers 190A-C in order to facilitate formatting of a response to client device 155. Automation orchestration device 160 can need to connect to or operate a virtual browser or virtual machine in order to transform messages from other devices (e.g., language processing device 170) into a format comprehensible to internal application server 190A-C.

3. Functional Descriptions

3.1. Example Computing and Data Components

Figure 1B:
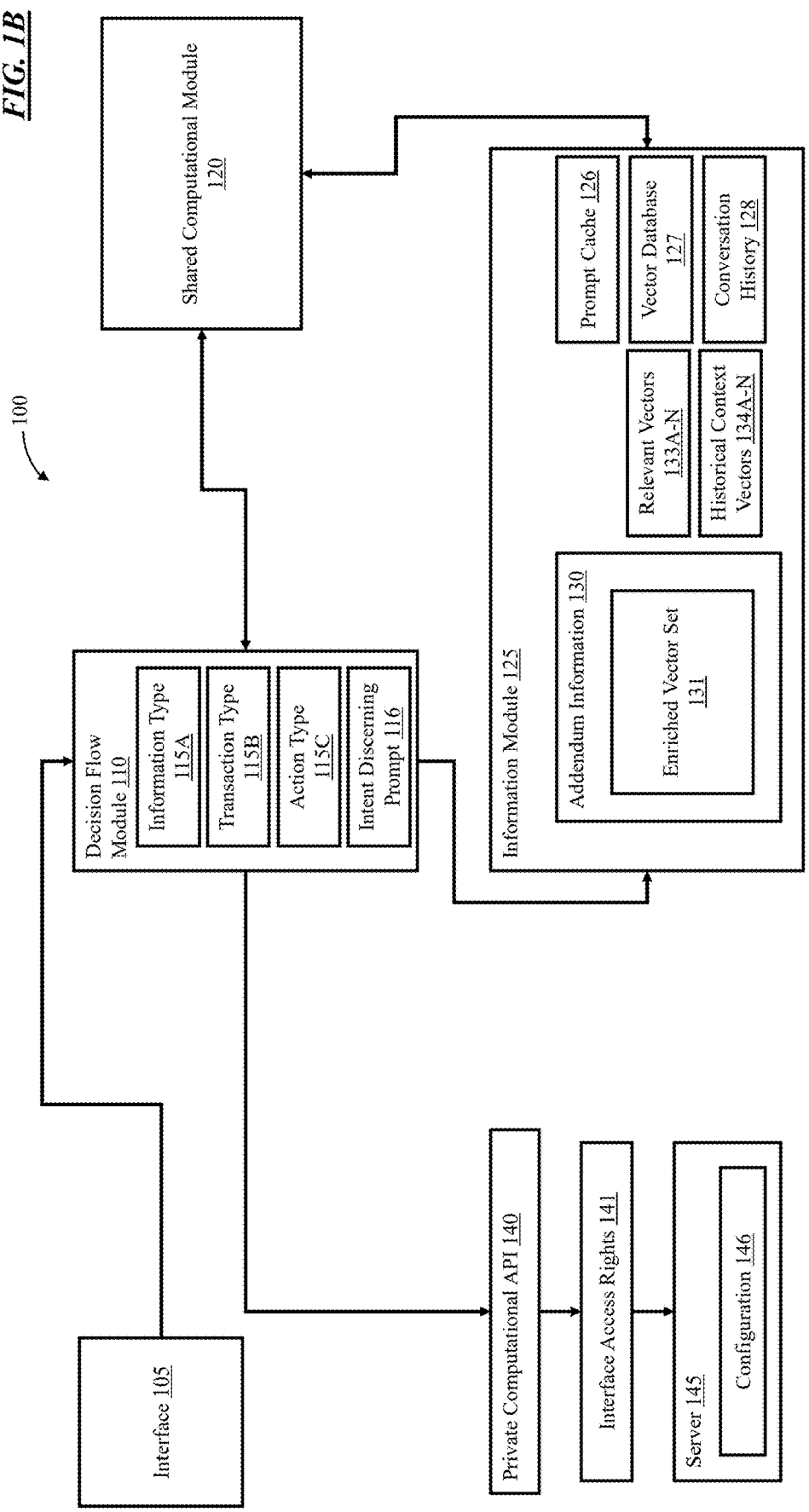
FIG. 1B illustrates a relational diagram depicting an exemplar software orchestration-by-intent system of an exemplar networked computer system.

FIG. 1B illustrates a relational diagram depicting an example software orchestration system of an example networked computer system.

As described further herein, to process user queries from the interface 105 of the client device 155, the automation orchestration device 160 can be configured to implement a decision flow module 110. In some embodiments, the decision flow module 110 receives the user query, and assigns a type to the user query. In some embodiments, the types in the decision flow module include an information type 115A, a transaction type 115B, and an action type 115C. The types 115A-C are signifiers or categories, and can be stored as a string ("information", "transaction", "action") an integer, an enumerated type, or any other kind of variable or pointer, of which one variable or pointer 115A-C may be distinguishable from another variable or pointer 115A-C which are also used as signifiers or categories of categorized user queries. In some embodiments, information type 115A is associated with user queries directed to requests for static information stored in standalone documents. Execution of such user queries can include retrieving information from the shared computational module 120, the information module 125, or a combination thereof. In some embodiments, transaction type 115B is associated with user queries directed to requests for dynamic, possibly interactive information, which can be available in a database management system (DBMS) and related to running applications. Execution of such user queries can include retrieving information through the private computational API 140. The retrieved information can be combined or supplemented with information from the shared computational module 120 or the information module 125. In some embodiments, action type 115C is associated with user queries directed to requests for making changes related to computer applications, which when executed cause information modifiable through the private computational API 140 to be modified. In order to discern the type 115A-C, the decision flow module 110 can include an intent discerning prompt 116. In some embodiments, the intent discerning prompt 116 can be applied by the decision flow module 110 to the user query, producing a type 115A-C. In other embodiments, the intent discerning prompts 116 are bundled with the user query and sent together to the language processing device 170 for processing by shared computational module 120. The intent discerning prompts 116 could be stored at the shared computational module 120, or within the information module 125 within the caching and query augmentation device 180.

In some embodiments, the intent discerning prompts 116 could be human-readable, and can be as simple as a sentence fragment reciting "determine the intent of the following text" prepended to the user query text. In some embodiments, the intent discerning prompts 116 can arrive at the shared computational module 120 as a separate object or record in the same message as the user query, or in a separate message from the user query. In some embodiments, the intent discerning prompts 116 can be in the format of an embedded or embeddable vector, or another data structure.

In some embodiments the user query, in concert with the intent discerning prompts 116, has a type 115A-C ascribed. The type 115A-C can be ascribed whether the user query is processed by the decision flow module 110, the shared computer module 120, or another module. In some embodiments, the type is categorically functional, such as an information type 115A, a transaction type 115B, or an action type 115C, as discussed above. In some embodiments, the type is categorically application-based, such as an intent to interact with internal application server 190A or an alternative intent to interact with internal application server 190B. In such cases, the type may be "Jira", "GitHub", "Splunk", or "Docker" which refer to software applications which store, process, and present information.

In some embodiments, depending upon the type 115A-C, one of several processes can occur. For an information type 115A, in some embodiments the user query is transmitted to the information module 125, in an attempt to ascertain if the information requested by the user query can be returned without further prompts or without inefficiently accessing the shared computational module 120. In a process further discussed in FIG. 2, query matching results are either returned to the interface via the decision flow module 110, or are propagated with the user query to the shared computational module 120 to produce a response to the user query. In other embodiments, the information type intent 115A can correlate non-exhaustively to a general information intent, a database reading intent, a conversational intent, or an intent to interact directly with the shared computational module 120.

In some embodiments, the information module 125 includes a query cache 126, which contains prior user queries and responses. By proactively checking the query cache 126 for relevant queries and responses, an additional communication with the shared computational module 120 can be avoided. The information module 125 can also include a vector database 127, which includes information of the organization organized into embedded vectors or vector embeddings. The relevant vectors 133A-N retrieved from the vector database 127 can be used to enhance the user query in processing at the shared computational module 120 as supplemental information. In such examples, the relevant vectors 133A-N can be combined with the user query before the user query is transmitted to the shared computational module 120. In some embodiments, the information module 125 can include a conversation history 128 between the interface 105 and the decision flow module 110. Some or all of the conversation history 128 can be vectorized into historical context vectors 134A-N and combined with the user query, in order to provide additional context to the shared computational module regarding the history of interactions to the interface 105, before producing a response. Alternatively, some or all of the conversation history 128 can be included as plain text records, and either prepended, inserted, or appended into the user query, or some or all of the conversation history 128 can be included in addendum information 130 to be sent to the shared computational module 120 along with the user query In some embodiments, for a transaction type 115B, the user query is ultimately transformed in part by the decision flow module 110 and passed to the private computational API 140. Private computational API 140 can be an application programming interface with access to one or more hardware endpoints. The one or more hardware endpoints can be connected directly or indirectly to internal application servers 190A-C. Internal application servers 190A-C can implement firmware capable of receiving network signals from network 199 and translating those network signals into application calls. Translated application calls are processed by the applications operating on internal applications server 190A-C to which those respective application calls were directed to, such as application calls from the decision flow module 110 implemented on the automated orchestration device, over network 199. Private computational API 140 can be implemented on one or more internal application servers 190A-C, or may be implemented on an intermediary server (not shown). The private computational API 140 interacts with one or more of the internal application servers 190A-C to perform transactions. Transactions are associated with user queries directed to requests for dynamic, possibly interactive information, which can be available in a database management system (DBMS) and related to running applications. The results of the transaction are then returned to the decision flow module 110, formatted, and then sent to the interface 105 for display.

In some embodiments, and some examples in those embodiments, before executing a transaction, the private computational API 140 will confirm the interface 105 is associated with proper access permissions to perform the transaction—these access permissions are interface access rights 141. In an example, the interface 105 can "sign" the user query using a private key, which is ultimately included with the transaction message from the decision flow module 110 for the private computational API 140 to process—the private computational API 140 can verify the private key with a public key stored in the interface access rights 141, thereby verifying that, at minimum, a request was made by interface 105 for processing at the decision flow module 110. Further, in some embodiments, the decision flow module 110 can also sign the response to the private computational API 140, which would confirm using the interface access rights 141 that the response provided to the private computational API 140 is in response to a user query with a matching private key (e.g., the user query signed by interface 105).

In some embodiments, the transaction type user query will request that a server 145 report data, such as a subset and/or combinations of records from a database within that server 145. Alternatively, the transaction type user query can request such a server 145 to report a current configuration 146, which could include a status of the server 145.

In some embodiments, a transaction type user query will need to be pre-processed in a manner similar to an information type user query. For example, the user query can be written in conversational, human-readable language, which the private computational API 140 is generally incapable of processing. Therefore, the information module 125, in concert with the shared computational module 120, can transform the user query into a set of computer-processable prompts. In further embodiments, these transformations can require specific information regarding the configuration 146 of the server 145 to be queried via the private computational API 140. In such cases, the vector database 127 can contain information regarding the configuration 146.

For example, the configuration 146 can include a database schema for a database on server 145. In such an example, a user query reciting "how many users are active on the first application" will need to be transformed into something transactable with the private computational API 140. First, the conversational query will have intent ascribed using the processes described herein, and be associated with the transaction type 115B. In some embodiments, the intent deciding process can also perform a preliminary relevance check. The preliminary relevance check can include a listing of domains, which can be provided either by the information module 125, or by the decision flow module 110. The listing of domains, or a subset of the listing of domains can be included in the user query. In some embodiments, the list of domains can be included in the intent discerning prompt 116. Domains can include a relatively high-level object in a database hierarchy. For example, domains can be servers, databases, schemas, tables, or any other data structure which is not a terminal node. Continuing the example above, the intent deciding process can transform the user query into "count users set as active on internal application server 190A". The user query is then reprocessed, with an enriched vector set 131 including at least the database schema relevant to the user query, and in some embodiments the database schema for every database or data structure behind private computational API 140. Reprocessing can require additional pre-reprocessing steps: for example, one step to identify which database or domain is required, then a second step to determine which attributes or columnar data is required from the identified database or domain. An interstitial step of identifying which table in a required database or domain is required can occur. Similarly, in some embodiments the enriched vector set 131 can include the function interface definitions used to prepare function calls to interface with the private computational API 140, in order for the response from the shared computational model 120 to conform, at least in part with the format or content expected by the private computational API 140.

In some embodiments, configuration 146 can include documentation, such as software interfaces including abstract methods or properties (e.g., a C#interface or a Java interface), software classes or function headers and parameters. In such examples, the vector database 127 can include the documentation as one or more embedded vectors, which can be retrieved as a relevant vector 133A-N when required by the user query.

In some embodiments, the response from the private computational API 140 will be formatted into a message which readily allows for further user queries with a transaction type 115B. For example, as seen further in FIG. 5, tabular data can be returned to the interface 105—that tabular data can include a column of linked data, such that when the link is interacted with, a preformatted user query is sent from the interface 105 to the decision flow module 110, preferably to obtain information, perform a transaction, or carry out an action related to data associated with the interacted link.

In some embodiments, for an action type 115C, the user query is ultimately transformed in part by the decision flow module 110 and passed to the private computational API 140. The private computational API 140 interacts with one or more of the internal application servers 190A-C to perform an action. Any results of the action are then returned to the decision flow module 110, formatted, and then sent to the interface 105 for display. In this context, "actions" differ from "transactions" in that "actions" cause a durable effect upon the underlying internal application server 190A-C, —such as changing a configuration 146, updating a stored record, or reconfiguring an interconnection to one or more other services. Conversely, "transactions" cause no, minimal, or a transient effect upon the underlying internal application server 190A-C. Transactions generally involve viewing or reading data or configurations 146, while not altering that viewed data or configuration 146 by performing the observational act. Transactions can affect interstitial or intermediary objects, such as temporary tables, caches, or random access memory (RAM) of the internal application server 190A-C. Generally, these changes will not materially affect future actions or transaction—having to reload a stale cache entry which was voided due to the transaction needing to cache an entry in order to read data would generally not be considered as more than a transient effect. The universe of steps performable by any device upon the internal application servers 190A-C via the private computational API 140 would qualify as either an "action" or a "transaction"—there is no disclaimed type of interaction in this category.

The processing of an action type user query actions can involve additional verification or validation prior to altering the state of the internal application servers 190A-C. In some embodiments, interface access rights 141 can differ, as an interface 105 can have permission to view data, but not to modify data or configurations. Further, the command message sent from the decision flow module 110 to the private computational API can be subjected to further validation processes, in order to confirm that the command falls within appropriate scope. For example, a command message can be limited to disabling a single server 145 per command message, or prevented from disabling all servers 145 within a load-balanced cluster, to prevent an errantly-interpreted command message from inadvertently deactivating an entire cluster of servers (e.g., "turn off server 01 of cluster 01" is interpreted as "turn off server 01; turn off cluster 01", resulting in all of cluster 01 being deactivated.)

3.2. Query Processing

Figure 2:
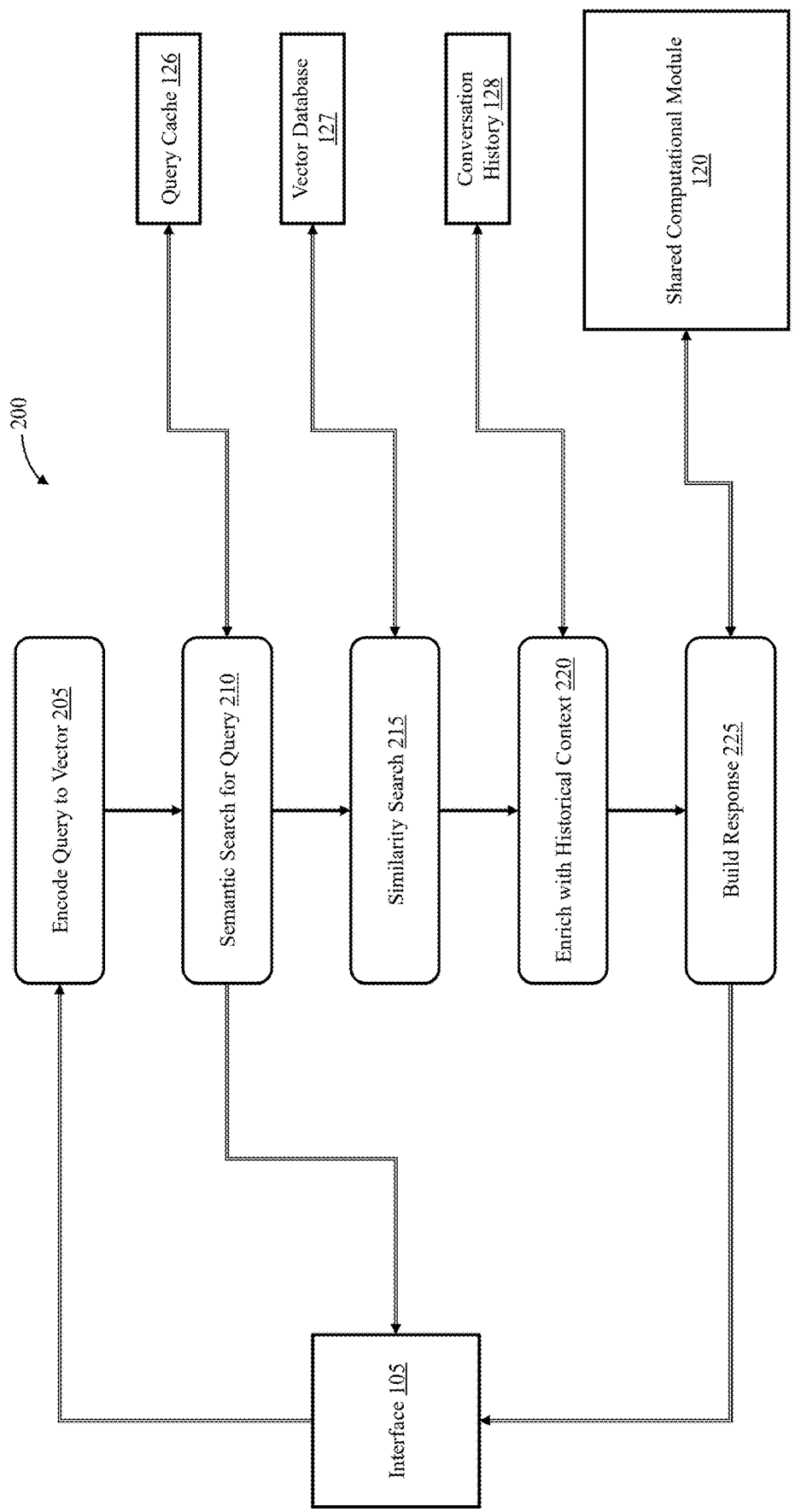
FIG. 2 illustrates an exemplar process flow performed by the networked computer system in executing the software orchestration-by-intent system.

FIG. 2 is shown in simplified, schematic format for purposes of illustrating a clear example and other embodiments may include more, fewer, or different elements connected in various manners. FIG. 2 illustrates an example process flow 200 performed by the automation orchestration device 160 in conjunction with the caching and query augmentation device 180 regarding an information type user query. Blocks 205, 210, 215, 220, and 225 represent the exemplar process flow 200, while lines indicating messages between modules and elements 105, 120, 126-128 are shown to improve clarity.

Before block 205, the interface 105 sends a user query to the decision flow module 110, and the decision flow module 110 has directly or indirectly determined the intent of the user query to be an information type 115A user query. In block 205, the user query is encoded as an embedded vector or a vector embedding for a semantic search. In block 210, that embedded user query vector is subject to a similarity search for similar queries at the query cache 126. When a hit is returned from the query cache 126, the response associated with the hit stored in the query caches 126 is returned as a response to the interface. An example here might be the user query "is Veterans Day a firm holiday?" Many users can ask this same question, or a similarly-worded question, near the same time (i.e., soon before Veterans Day). The query cache 126, after the first time it is queried, can store this query and the resulting response: "Yes, Veterans Day is a firm holiday." On subsequent requests, the semantic search can identify a similarity between the embedded user query vector and the record in the query cache 126, returning the cached answer to the interface 105 without proceeding further in the process 200.

When the semantic search does not return a hit, in block 215 the embedded user query is searched at the vector database 127 for related vectors (e.g., relevant vectors 133A-N) that could suggest query responses. These related vectors searched do not necessarily contain the answer to the query, but can include information that would enhance or better direct any later effort to determine an answer to the query. These related vectors could represent related queries, data likely responsively to the queries, or identifies of documents that are likely responsive to the queries.

In block 220, the embedded user query vector is also combined with relevant conversation history 128. Relevant conversation history 128 can include contextual information which can also enhance or better direct any later effort to determine an answer to the query. Relevant conversation history can be returned in an embedded vector format (e.g., historical context vectors 134A-N). Alternatively, relevant conversation history can be returned in a plain text, human readable format as a collection of one or more records. Continuing the example above, based on the conversation history 128 with the interface 105, the conversation history 128 can indicate that the user of interface 105 is a United States Veteran. This information in this example can be pertinent to whether the firm holiday of Veterans Day grants the user of interface 105 a holiday (i.e., at some organizations Veterans Day is only available as a holiday to United States Veterans). Therefore, that information will be used to enrich the query for future steps.

In block 225, once any vector data similar or related to the embedded user query vector (i.e., relevant vectors 133A-N, historical context vectors 134A-N), and any conversation history 128 is identified to enrich the embedded user query vector (i.e., historical context vectors 134A-N or plain text conversation history 128), that collective data (e.g., the user query and the enriched vector set 131, which includes relevant vectors 133A-N if returned in block 215, historical context vectors 134A-N if returned in block 220, and any other vectors which may facilitate success or efficiency of the user query, from the interface 105, decision flow module 110, information module 125, or any other module directly or indirectly connected to network 199) is sent to the shared computational module 120. That shared computational module 120 then processes the user query in light of the enriched vector set 131, and returns a response. That response is directly or indirectly received at the interface 105. In embodiments where shared computational module 120 is a generative artificial intelligence module, shared computational module 120 can be configured to receive user queries with supplemental embedded vectors, and semantically query an LLM, in order to produce and return text or other forms of data responsive to the query. The returned text or other data is produced based upon vectors accessible to the LLM, and can be further based upon any supplemental embedded vectors (e.g., enriched vector set 131). The returned text or other data can also further be produced based on non-vector data transferred with the user query (e.g., elements of addendum information 130 not included in enriched vector set 131), which can include plain text instructions for the shared computational module 120. It is contemplated that shared computational module 120, in addition or as an alternative to a generative AI system, can instead accept queries, instructions, and/or vectors, and instead of generating data responsive to the queries, retrieving data from a database responsive to the queries. To illustrate, the user query can be written in natural language, but can be translated into precise computer instructions, which are then used to return specific records from within a data source to which the shared computational module 120 has access.

3.3. Example Graphical User Interface

Figure 3:
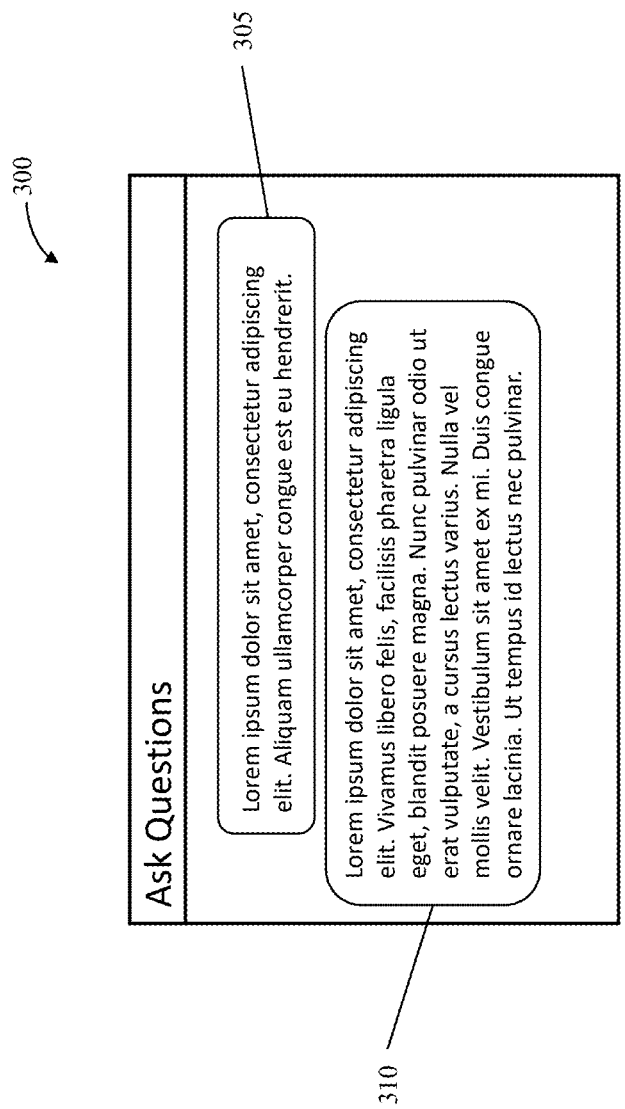
FIG. 3 illustrates an example process performed by a computer application server in accordance with disclosed embodiments.

FIG. 3 illustrates an example screen 300 of the software orchestration-by-intent system 100 responding to a query from a user in a chat window with responsive text. In this example screen, the first text block 305 is a user query that was sent from the interface 105, then processed by the decision flow module 110 to determine an information type 115A. Next, the user query was passed through the information module 125, where the user query was enriched with relevant vectors and historical context vectors 134A-N based on prior conversation at the example screen 300. The enriched user query was processed by the shared computational module 120, which in this example is ChatGPT or a similar service, which ultimately produced a response. The response was sent to the decision flow module 110, where it was formatted for display in a chat message, and sent to the interface 105 for display below the original user query text block as the second text block 310.

Figure 4:
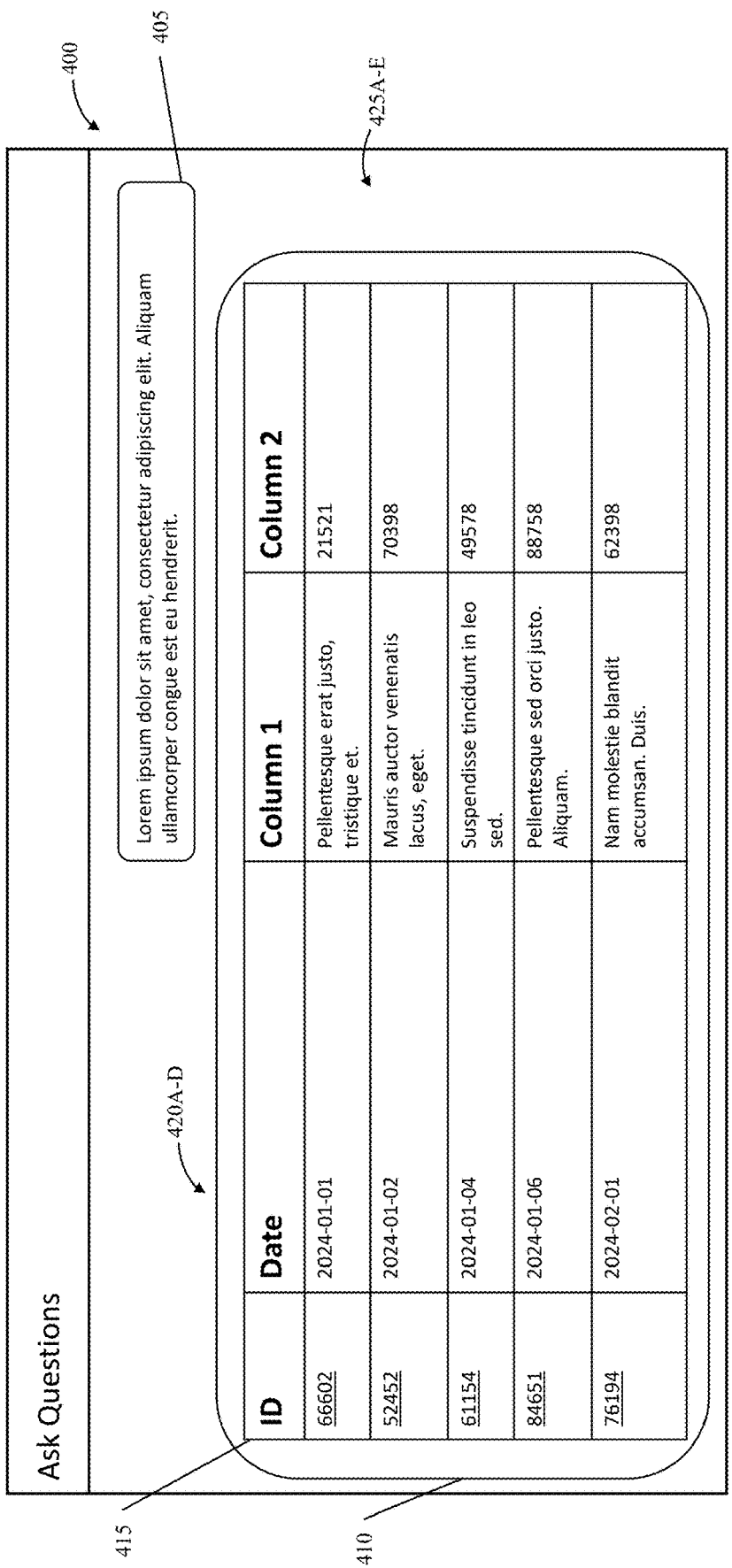
FIG. 4 illustrates an example screen of the software orchestration-by-intent system responding to a query from a user in a chat window with responsive text.

FIG. 4 illustrates an example screen 400 of the software orchestration-by-intent system responding 100 to a query from a user in a chat window with a responsive dynamic table. In this example screen, the first text block 405 is a user query that was sent from the interface 105, then processed by the decision flow module 110 to determine a transaction type 115B. Next, the user query was passed through the information module 125, where the user query was enriched with relevant vectors 133A-N and historical context vectors 134A-N. In this example, the relevant vectors 133A-N included an elements database schema. The enriched user query was processed by the shared computational module 120, which received the user query and the relevant database schema vectors, and produced a database query to be executed at the private computational API 140. In this example, the database query is a structured query language (SQL) query. The response was sent to the decision flow module 110. The decision flow module 110 formatted the response for querying at the private computational API 140. The formatted response was sent to the private computational API 140, which in this example executed the SQL query. The SQL query transaction response was sent from the private computational API 140 to the decision flow module 110, which formatted the transaction response as a table 415 with columns 420A-D and rows 425A-E for display below the original user query text block as the second text block 410. In addition, the records in the first column 720A are hyperlinks—a click at the interface 105 will trigger additional user queries directed to the ID which was clicked.

Figure 5:
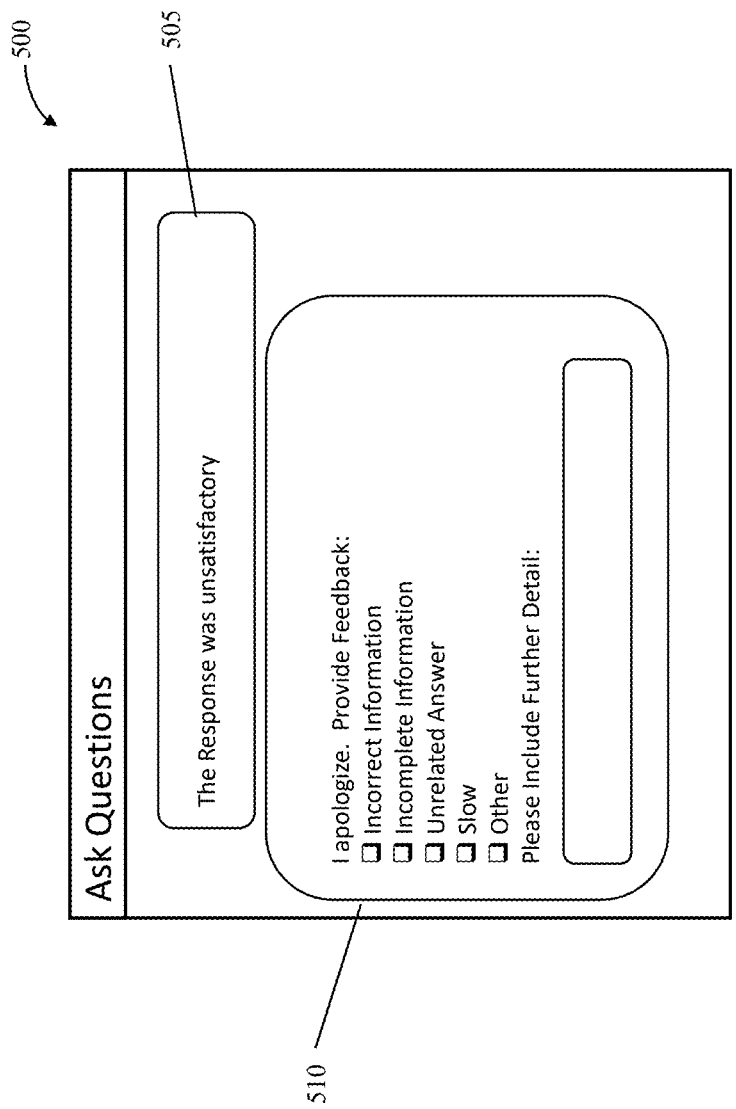
FIG. 5 illustrates an example screen of the software orchestration-by-intent system responding to a query from a user in a chat window with a responsive dynamic table.

FIG. 5 illustrates an example screen 500 of the software orchestration-by-intent system responding to a dissatisfaction statement from a user in a chat window with a survey. In this example screen, the first text block 505 is a user query regarding a previous Response that was sent from the interface 105 which indicates dissatisfaction with a prior response. That user query is processed, and a survey 510 is presented to the interface 105. The survey result (answer to the survey 510) provided by the user can be recorded for human review, or review by the shared computational module for auto ingestion 120 to enable the system to generate a correct Response in the future. Ultimately, the survey response can be used in modifying elements of the decision flow module 110, in particular the intent discerning prompts 116.

FIG. 6 illustrates an example screen 600 of the software orchestration-by-intent system 100 responding to a query from a user in a chat window with a responsive database(s) query command. This example screen 600 operates substantially similarly to example screen 400, excepting that instead of system 100 executing the transactional SQL or NoSQL data query generated by the shared computational module 120, the transactional SQL or NoSQL data query itself is transmitted to the interface 105. The user of the interface 105 can then review the transactional SQL or NoSQL data query, revise it, and either instruct the system 100 to execute query, or the interface 105 can transfer the transactional SQL or NoSQL data query to a third-party service for execution. Doing so can be advantageous if the results of the transactional SQL or NoSQL data query are expected to be onerous, or the access rights for executing the transactional SQL or NoSQL data query are complex to manage. In certain embodiments, the example screen could also show formatted results of executing the database query.

Figure 7:
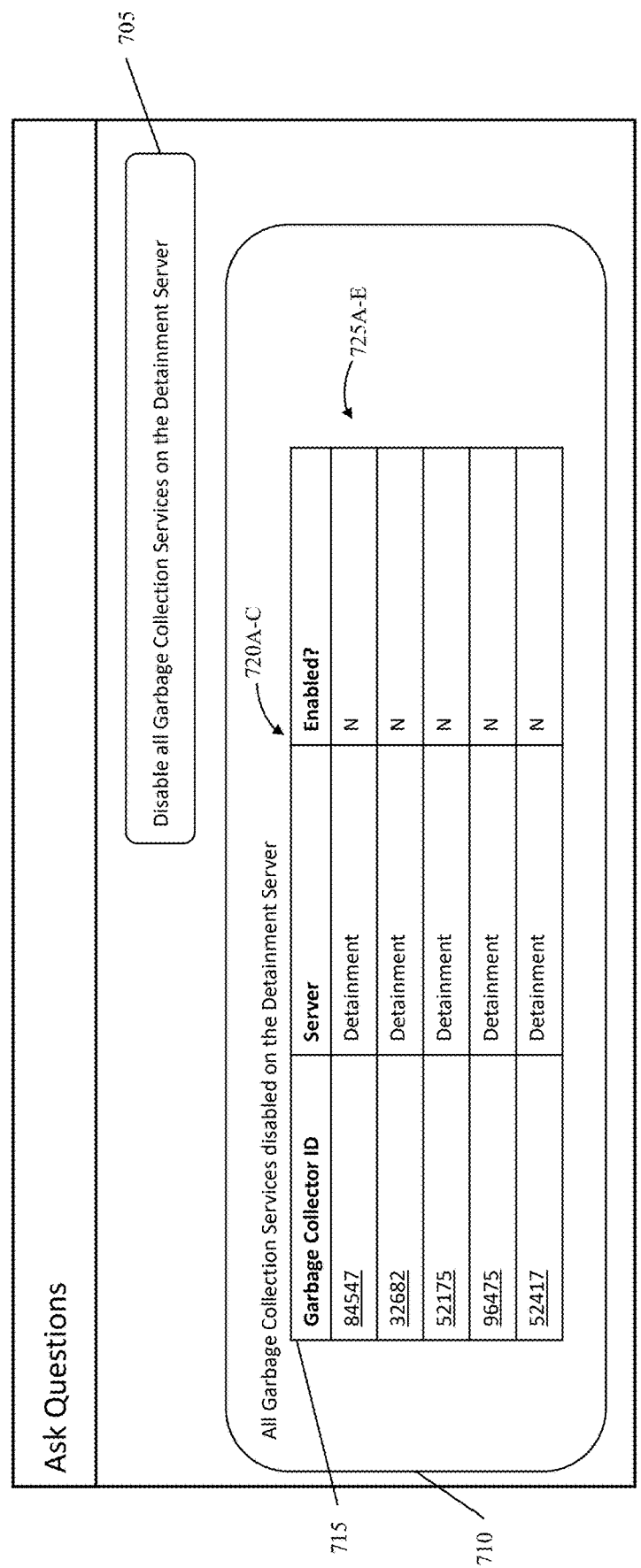
FIG. 7 illustrates an example screen of the software orchestration-by-intent system responding to a query from a user in a chat window with a responsive database query command.

FIG. 7 illustrates an example screen 700 of the software orchestration-by-intent system 100 responding to a query from a user in a chat window 700 with the results of a responsive application action. In this example screen, the first text block 705 is a user query that was sent from the interface 105, then processed by the decision flow module 110 to determine an action type 115A. Next, the user query was passed through the information module 125, where the user query was enriched with relevant vectors 133A-N and historical context vectors 134A-N. In this example, the relevant vectors 133A-N included a elements database schema. The enriched user query was processed by the shared computational module 120, which received the user query and the relevant database schema vectors, and produced a database query to be executed at the private computational API 140. At the private computational API 140, interface access rights 141 are checked to confirm that the interface 105 has sufficient permissions to execute the database query. Next, the query was executed. In this example, all garbage collection services on a detainment server are disabled. After execution, the private computation API returns a response indicating the status of each garbage collector affected. That response is sent to the decision flow module 110. The response is sent from the private computational API 140 to the decision flow module 110, which formats the transaction response as a table 715, including columns 720A-C and rows 725A-E for display below the original user query text block as the second text block 410.

4. Example Processes

Figure 8:
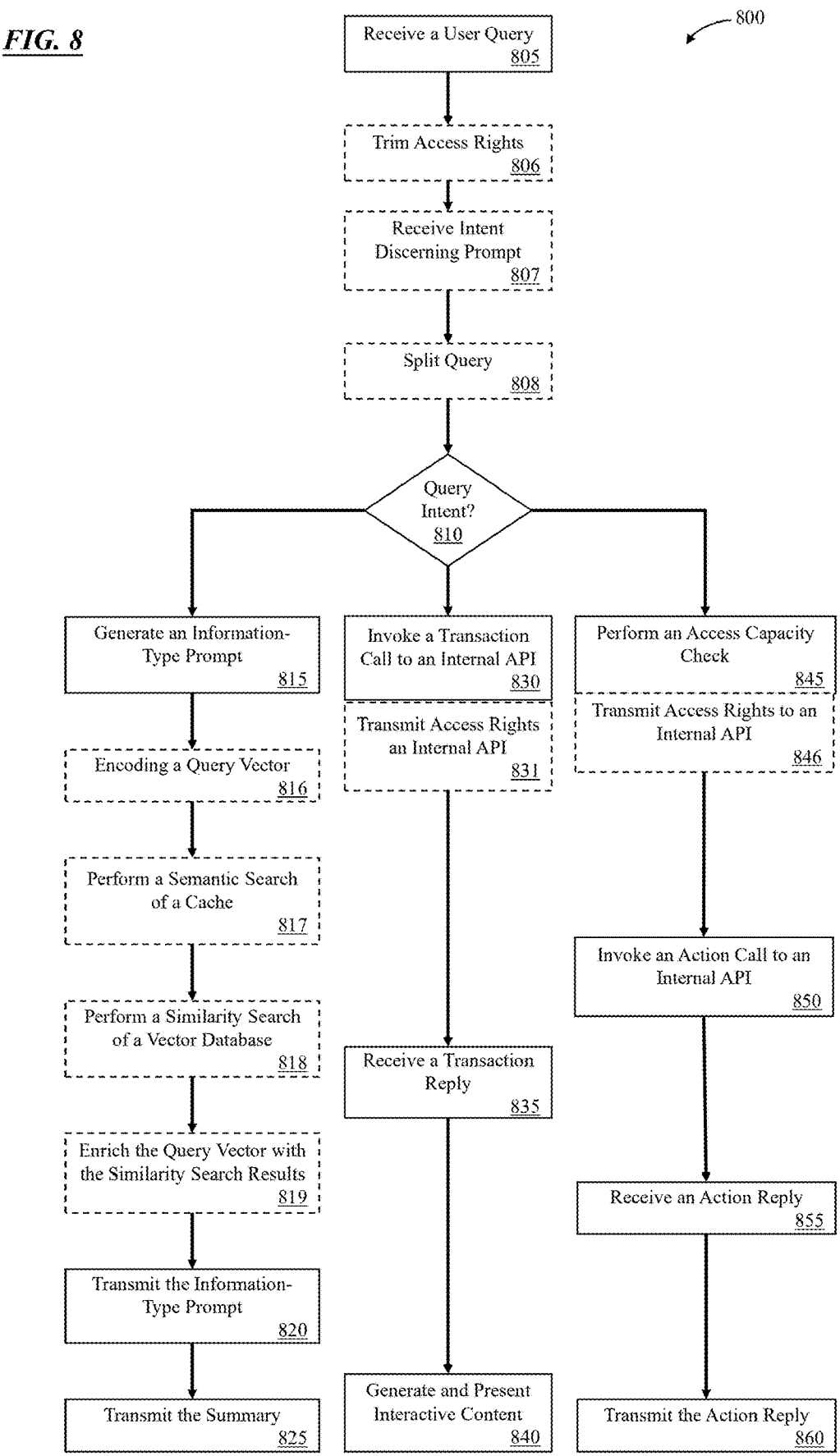
FIG. 8 illustrates an example screen of the software orchestration-by-intent system responding to a query from a user in a chat window with the results of a responsive application action.

FIG. 8 illustrates an example process 800 performed by a computing system in accordance with disclosed embodiments. Process 800 generally conforms with the process and features disclosed throughout the application. FIG. 8 is shown in simplified, schematic format for purposes of illustrating a clear example and other embodiments may include more, fewer, or different elements connected in various manners. FIG. 8 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In block 805, a user query is received. The user query can be any kind of request. In some embodiments, the user query is a human-readable, natural language text block.

In some embodiments, in block 806 the information regarding access rights included in or associated with the user query is trimmed. In embodiments where the shared computational module 120 is an external resource to the computing system, removing access rights information, such as usernames, passwords, and keys from the user query can be prudent before forwarding the user query to the shared computational module 120. In particular if the shared computational module 120 learns from queries, that learned information can be stored within the shared computational module 120 and used in responding to other, third-party queries.

In some embodiments, in block 807 an intent discerning prompt 116 can be received. In some embodiments, intent discerning prompt 116 can also already be possessed by the device implementing process 800. In some embodiments, intent discerning prompts 116 can be specific to the user query. In some embodiments, intent discerning prompts 116 can include additional information prepended or appended to the user query. For example, intent discerning prompts 116 can appear in some embodiments to include portions as similar to the following text, appended after the user query:

"determine the intent of the preceding text of a user query.

The intent must fit one of the following categories:

'Information', 'Transaction', 'Action' or a combination. Choose the best fit for intent.

'Information' text would involve a query regarding general information at the user's organization, including static information or standalone documents.

'Transaction' text would also involve a searching or reading user query, but related to databases, database software, or project tracking software at the user's organization.

'Action' text would involve a creating, inserting, or updating query related to API, databases, database software, or project tracking software at the user's organization.

Return only the categorized intent. Do not hallucinate or falsify information."

In some embodiments, in block 808 the user query is split into a intent portion and a content portion. The interface 105 can incorporate metadata, such as information regarding the query type, into the user query or the message being transmitted. In an example, if the user query begins with "#transaction_intent", in block 808 the octothorpe in the user query can be a signifier of an intent codeword. The user query can be split into two portions, one containing "#transaction_intent" and another including the remainder of the text. When this splitting is performed, in some embodiments of the following blocks the query intent is solely or predominantly determined by the intent codeword, while the actual query to be performed would be determined by the remainder of the text. The metadata can be related to other types of information, such as the database to access or the application server to ping. The metadata can also be expressed in various formats, such as using other special strings or symbols, to clearly indicate that it is to be interpreted as metadata. Continuing with the example above, in such embodiments the intent identifier might further recite:

"When the preceding text begins with '#information intent', determine that the intent is 'Information'.

When the preceding text begins with '#transaction_intent', determine that the intent is 'Transaction'.

When the preceding text begins with '#action_intent', determine that the intent is 'Action'."

In block 810, the user query intent is identified, based at least on some portion of the user query. In some embodiments, an intent discerning prompt 116 can be used to aid in determining types 115A-C. As discussed above, the intent discerning prompt 116 can be prepended, included, interspersed, or appended to the user query. The resulting combined user query and intent discerning prompt 116 can be sent to a shared computational module 120 as a prompt, which is processed by the shared computational module 120. The shared computational module 120 then returns one type 115A of the plurality of types 115A-C which the shared computational module 120 has identified as fitting most closely with the user query.

Process 800 proceeds to block 815 when the intent is determined to be an information type 115A; to block 830 if the intent is determined to be a transaction type 115B; or to block 845 if the intent is determined to be an action type 115C. It is disclosed but not shown that in some cases, intent cannot be determined—in such cases, the process 800 is designed to fail gracefully, and potentially ask the interface 105 to restate the user query request in a subsequent user query.

In block 815, an information type prompt is generated. The information type prompt generally will include some or all of the user query text. In some embodiments, in block 816 the user query text is encoded into a query vector, in order to facilitate the process 200. As in process 200, in block 817 in some embodiments a semantic search of a query cache 126 is performed in an attempt to determine whether the information type prompt has already effectively been satisfied.

In some embodiments in block 818, like in process 200, a similarity search of a vector database 127 can be performed, in order to find relevant vectors 133A-N which can enhance the user query upon submission to the shared computational module 120. The similarity search can be facilitated by executing an interstitial prompt at the shared computational module 120: such a prompt can request that the shared computational module 120 determine tags or elements within the user query. Tags or elements can be provided as examples (e.g. "if the question is 'what is the weather in New York' the tags could be 'Weather' and 'New York'") or tags can be explicitly identified in the prompt, with directions for the shared computational module 120 to specifically seek out those elements (e.g., "identify any values associated with the following tags: 'server_name': the name of a server; 'issue_ID': the identification number of a JIRA issue; 'severity_code': {high, medium, low} severity of an issue.") The results of execution of the interstitial prompt can be included with the user query in later blocks.

Block 819, in some embodiments includes enriching the user query with the search results, which include the relevant vectors 133A-N. This block 819 can also include enriching the user query with historical context vectors 134A-N from the conversation history 128 of the interface 105. Such enrichment can be triggered by keywords or key phrases in the user query, such as "how was this issue resolved in the past?" or a part thereof. The conversation history 128, when in a plain text format, can be prepended, inserted, or appended to the user query. In some embodiments, block 819 occurs before block 818. In such embodiments, the conversation history 128 is included with the user query when submitting the interstitial prompt, and the interstitial prompt is modified to utilize the conversational history (e.g., "A Chat History appears below. Use the Chat History for better context. In particular, use the Chat History to substitute pronouns in the user query for the most likely noun in the Chat History.")

In block 820, the information type prompt, which includes the user query and any addendum information 130 which may have been produced in blocks 818 or 819, is transmitted to the shared computational module 120. In block 825, a summary of the response from the shared computational module 120 is transmitted to the interface 105. Summarizing can include reformatting the output from the shared computational module 120.

In block 830, a transaction call to an internal API 140 is invoked. The internal API could broadly include a software module or include an additional programming interface to further facilitate communication with and functional control of the software. A transaction call is a signal or message structured according to a communications protocol expected by an internal application, such as a database server. The internal API 140 receives the transaction call and transfers the transaction call, or the contents of the transaction call, to a server or service accessible to the network 199 via the internal API 140. The server or service then returns a response, which is passed through the internal API 140 out to some recipient device connected to the network 199. A transaction call can involve making a functional call, submitting a database query, or otherwise directing an application to generate information, for the general purpose of receiving the response at the recipient device connected to the network 199. In some embodiments, the transaction call was formed on a prior execution of process 800 proceeding down block 815-825. In some embodiments, when the information regarding access rights included in or associated with the user query was trimmed in block 806, or if information regarding access rights associated with the user query are not included in the transaction call for some other reason, information regarding access rights associated with the user query are also transmitted to the internal API 140, where the information regarding access rights associated with the user query are validated against the interface access rights 141 for the particular transaction call. In block 835, the internal API 140 produces a transaction reply. In some embodiments, the transaction reply includes data for consumption at interface 105. In block 840, interactive content, such as links to pre-configured user queries, are generated based on the transaction reply. The interactive content, along with some or all of the transaction reply, are returned to the interface 105, to inform the user of interface 105 and facilitate additional user queries.

In block 845, an access capacity check is performed. An access capacity check confirms that the access rights associated with the interface 105 are aligned with the commands received from the decision flow module 110, or additional approval is requested. In some embodiments, in block 846 the access rights associated with the interface 105 are transmitted directly or indirectly to the private computational API 140. In some embodiments, interface access rights 141 are maintained entirely behind the private computational API 140. In block 850, after access capacity is checked, an action call is invoked to the private computational API 140. An action call is a signal or message structured according to a communications protocol expected by the internal API 140. The internal API 140 receives the action call and transfers the action call, or the contents of the transaction call, to a server or service accessible to the network 199 via the internal API 140. The server or service updates some value or data structure, and optionally returns a response, which can be passed through the internal API 140 out to some recipient device connected to the network 199. An action call can involve making a functional call, submitting a database query, or otherwise directing an application to take any action, for the general purpose of making changes related to computer applications accessible from the network 199 via the internal API 140. In block 855, an action reply from the private computational API 140 is received. In block 860, that action reply is transmitted to the interface 105.

Figure 9:
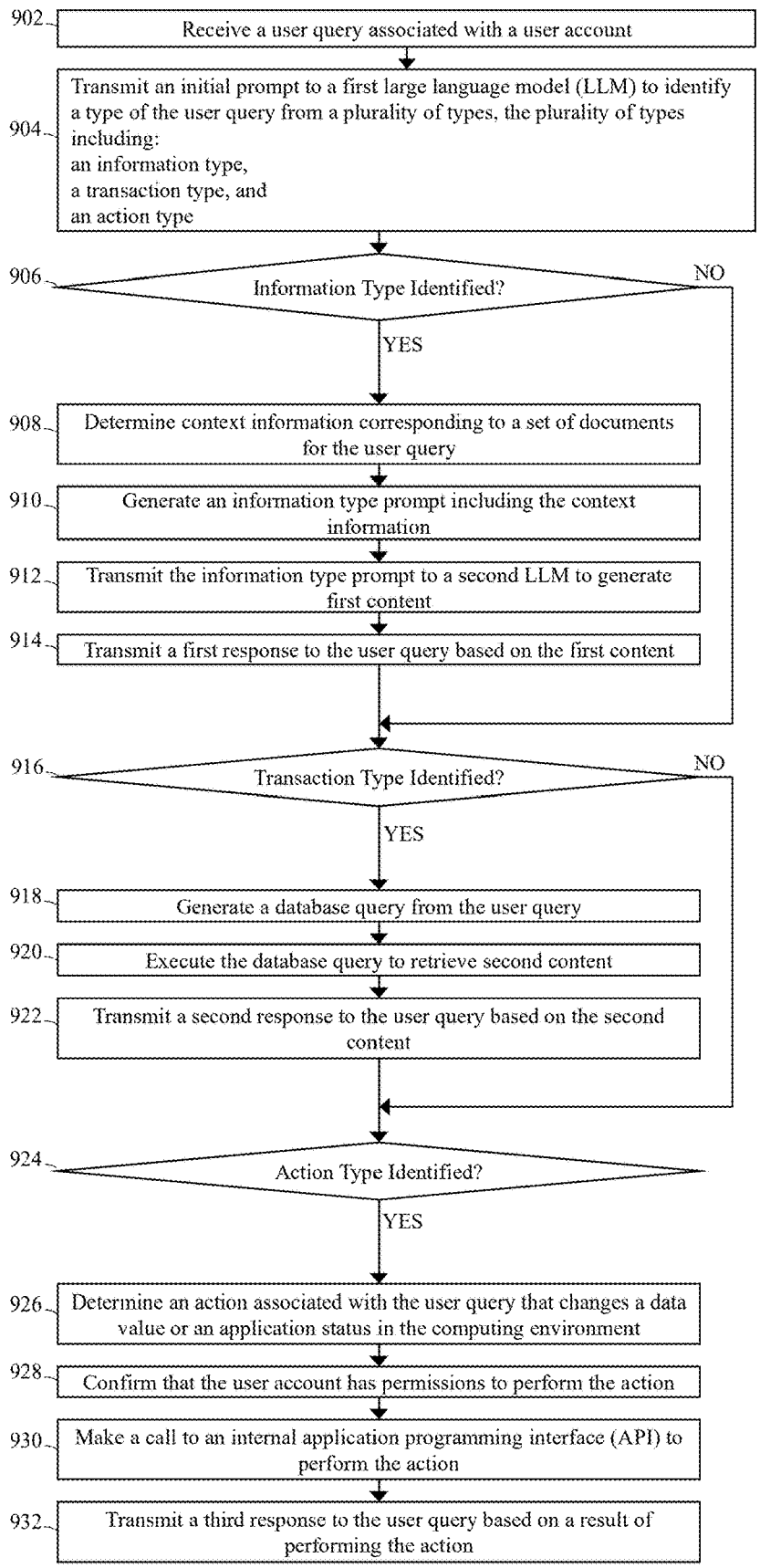
FIG. 9 illustrates an example process of categorizing and processing user queries related to a computing environment using artificial intelligence performed by a networked device in accordance with some embodiments described herein.

FIG. 9 illustrates an example process of categorizing and processing user queries related to a computing environment using artificial intelligence performed by a networked device in accordance with some embodiments described herein. FIG. 9 is shown in simplified, schematic format for purposes of illustrating a clear example and other embodiments may include more, fewer, or different elements connected in various manners. FIG. 9 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 902, the networked device is programmed to receive a user query associated with a user account.

In certain embodiments, the networked device is programmed to remove an access rights record from the user query, producing a trimmed user query, wherein the initial prompt is produced based upon the trimmed user query.

In certain embodiments, the network device is programmed to splitting a textual portion of the user query into a scope portion and a substance portion.

In step 904, the networked device is programmed to transmit an initial prompt to a first LLM to identify a type of the user query from a plurality of types, the plurality of types including: an information type, a transaction type, and an action type. In certain embodiments, identifying the type of the user query from the plurality of types further includes receiving a plurality of intent identifiers, and identifying the type of the user query based on a determined association between a respective type of the plurality of types and one or more intent identifiers of the plurality of intent identifiers. In other embodiments, identifying the type of the user query from a plurality of types is based upon a scope portion, and excludes identifying based upon a substance portion.

In step 906, when the identified type of the user query is the information type, the networked device is programmed to proceed to step 908. Otherwise, the networked device is programmed to proceed to step 916.

In step 908, the networked device is programmed to determine context information corresponding to a set of documents for the user query.

In step 910, the networked device is programmed to generate an information type prompt including the context information. In certain embodiments, the context information includes a database schema.

In step 912, the networked device is programmed to transmit the information type prompt to a second LLM to generate first content. In certain embodiments, the networked device is programmed to transmit the information type prompt to the second LLM to generate a summary of the context information based of one or more of prior information, transaction, and action responses.

In step 914, the networked device is programmed to transmit a first response to the user query based on the first content. In certain embodiments, the networked device is programmed to encode a textual portion of the user query as a query vector, perform a semantic search of a query cache using the query vector, and based on receiving a query hit from the query cache, transmit the first response to the user query based on a stored summary of the query hit. In other embodiments, the networked device is programmed to encode a textual portion of the user query as a query vector, perform a semantic search of a query cache using the query vector, based on receiving a query miss from the query cache, perform a similarity search of a vector database, enrich the user query with historical records from a conversation history associated with the user account, and transmit one or more relevant vectors of the relevant vector set and one or more historical records from the historical records to the second LLM.

In step 916, when the identified type of the user query is the transaction type, the networked device is programmed to proceed to step 918. Otherwise, the networked device is programmed to proceed to step 924.

In step 918, the networked device is programmed to generate a database query from the user query.

In step 920, the networked device is programmed to execute the database query to retrieve second content. In certain embodiments, executing the database query to retrieve second content further includes verifying interface access rights associated with the user query. In other embodiments, executing the database query to retrieve second content further includes transmitting read interface access rights associated with the user query, and making the call to the internal API to perform the action further includes transmitting write interface access rights associated with the user query. In yet other embodiments, the networked device is programmed to invoke a transaction call to the internal API to retrieve content, the transaction call including the database query based upon the summary of the context information.

In step 922, the networked device is programmed to transmit a second response to the user query based on the second content. In certain embodiments, the networked device is programmed to generate interactive content based on the second content, the interactive content configured to submit pre-populated additional user queries. In other embodiments, the second response includes a status of a server.

In step 924, when the identified type of the user query is the action type, the networked device is programmed to proceed to step 926.

In step 926, the networked device is programmed to determine an action associated with the user query that changes a data value or an application status in the computing environment. In certain embodiments, the action includes an instruction to update a configuration of a server.

In step 928, the networked device is programmed to confirm that the user account has permissions to perform the action.

In step 930, the networked device is programmed to make a call to an internal API to perform the action. In some embodiments, the networked device is programmed to generate an information type prompt including context information, the context information including an API specification including one or more call definitions of the internal API, transmit the information type prompt to the LLM to generate a summary of the context information, and make the call to the internal API to perform the action, the call including an message formatted according to a selected call definition from the summary of the context information.

In step 932, the networked device is programmed to transmit a third response to the user query based on a result of performing the action.

5. Example Implementation

According to one embodiment, the techniques described herein are implemented by at least one computing device. The techniques can be implemented in whole or in part using a combination of at least one server computer and/or other computing devices that are coupled using a network, such as a packet data network. The computing devices can be hard-wired to perform the techniques, or can include digital electronic devices such as at least one application-specific integrated circuit (ASIC) or field programmable gate array (FPGA) that is persistently programmed to perform the techniques, or can include at least one general purpose hardware processor programmed to perform the techniques pursuant to program instructions in firmware, memory, other storage, or a combination. Such computing devices can also combine custom hard-wired logic, ASICs, or FPGAs with custom programming to accomplish the described techniques. The computing devices can be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 10:
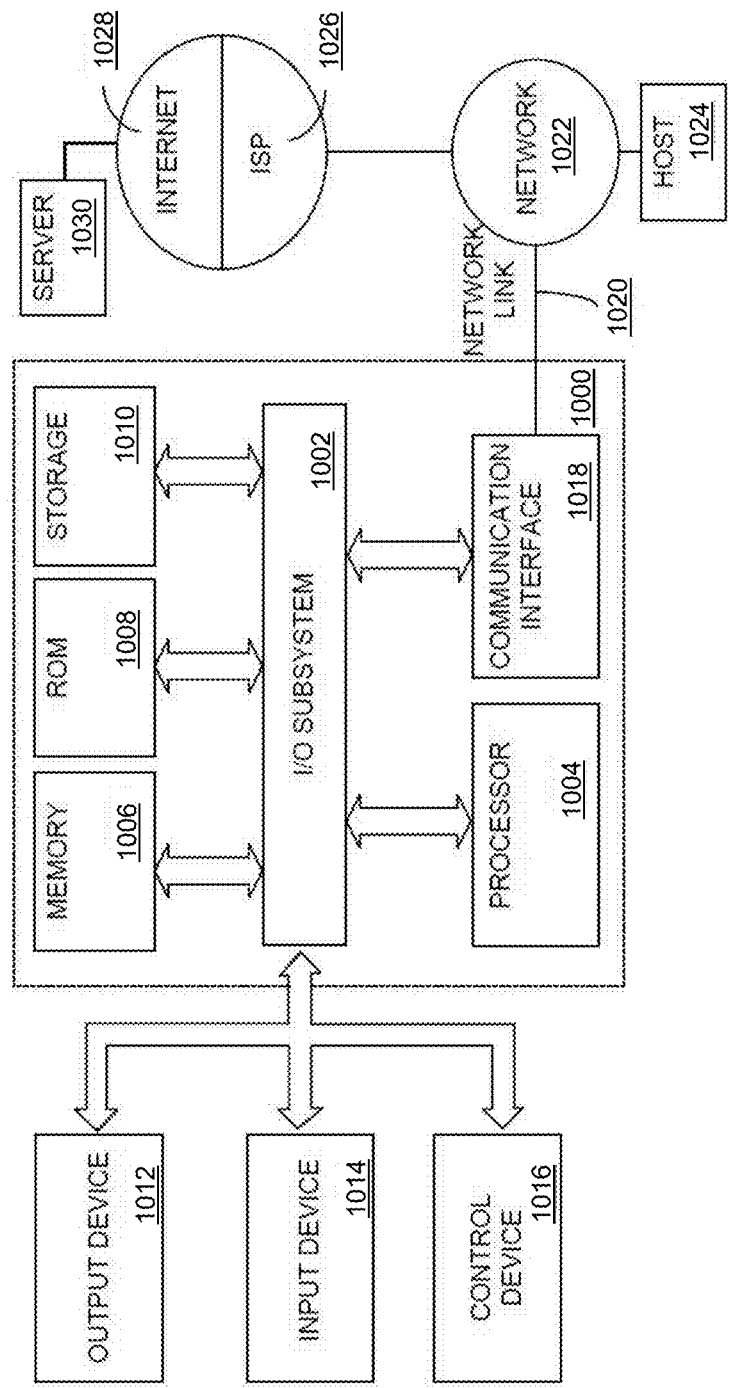
FIG. 10 illustrates a computer system upon which various embodiments may be implemented.

FIG. 10 is a block diagram that illustrates an example computer system with which an embodiment can be implemented. In the example of FIG. 10, a computer system 1000 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1000 includes an input/output (I/O) subsystem 1002 which can include a bus and/or other communication mechanism(s) for communicating information and/or instructions between the components of the computer system 1000 over electronic signal paths. The I/O subsystem 1002 can include an I/O controller, a memory controller and at least one I/O port. The electronic signal paths are represented schematically in the drawings, for example as lines, unidirectional arrows, or bidirectional arrows.

At least one hardware processor 1004 is coupled to I/O subsystem 1002 for processing information and instructions. Hardware processor 1004 can include, for example, a general-purpose microprocessor or microcontroller and/or a special-purpose microprocessor such as an embedded system or a graphics processing unit (GPU) or a digital signal processor or Advanced Reduced Instruction Set Computer (RISC) Machine (ARM) processor. Processor 1004 can comprise an integrated arithmetic logic unit (ALU) or can be coupled to a separate ALU.

Computer system 1000 includes one or more units of memory 1006, such as a main memory, which is coupled to I/O subsystem 1002 for electronically digitally storing data and instructions to be executed by processor 1004. Memory 1006 can include volatile memory such as various forms of random-access memory (RAM) or other dynamic storage device. Memory 1006 also can be used for storing temporary variables or other intermediate information during execution of instructions to be executed by processor 1004. Such instructions, when stored in non-transitory computer-readable storage media accessible to processor 1004, can render computer system 1000 into a special-purpose machine that is customized to perform the operations specified in the instructions.

Computer system 1000 further includes non-volatile memory such as read only memory (ROM) 1008 or other static storage device coupled to I/O subsystem 1002 for storing information and instructions for processor 1004. The ROM 1008 can include various forms of programmable ROM (PROM) such as erasable PROM (EPROM) or electrically erasable PROM (EEPROM). A unit of persistent storage 1010 can include various forms of non-volatile RAM (NVRAM), such as FLASH memory, or solid-state storage, magnetic disk, or optical disk such as CD-ROM or DVD-ROM, and can be coupled to I/O subsystem 1002 for storing information and instructions. Storage 1010 is an example of a non-transitory computer-readable medium that can be used to store instructions and data which when executed by the processor 1004 cause performing computer-implemented methods to execute the techniques herein.

The instructions in memory 1006, ROM 1008 or storage 1010 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions can implement a web server, web application server or web client. The instructions can be organized as a presentation layer, application layer and data storage layer such as a relational database system using structured query language (SQL) or NoSQL, an object store, a graph database, a flat file system or other data storage.

Computer system 1000 can be coupled via I/O subsystem 1002 to at least one output device 1012. In one embodiment, output device 1012 is a digital computer display. Examples of a display that can be used in various embodiments include a touch screen display or a light-emitting diode (LED) display or a liquid crystal display (LCD) or an e-paper display. Computer system 1000 can include other type(s) of output devices 1012, alternatively or in addition to a display device. Examples of other output devices 1012 include printers, ticket printers, plotters, projectors, sound cards or video cards, speakers, buzzers or piezoelectric devices or other audible devices, lamps or LED or LCD indicators, haptic devices, actuators, or servos.

At least one input device 1014 is coupled to I/O subsystem 1002 for communicating signals, data, command selections or gestures to processor 1004. Examples of input devices 1014 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1016, which can perform cursor control or other automated control functions such as navigation in a graphical interface on a display screen, alternatively or in addition to input functions. Control device 1016 can be a touchpad, a mouse, a trackball, or cursor direction keys for communicating direction information and command selections to processor 1004 and for controlling cursor movement on the output device 1012. The input device can have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1014 can include a combination of multiple different input devices, such as a video camera and a depth sensor.

In another embodiment, computer system 1000 can comprise an internet of things (IoT) device in which one or more of the output device 1012, input device 1014, and control device 1016 are omitted. Or, in such an embodiment, the input device 1014 can comprise one or more cameras, motion detectors, thermometers, microphones, seismic detectors, other sensors or detectors, measurement devices or encoders and the output device 1012 can comprise a special-purpose display such as a single-line LED or LCD display, one or more indicators, a display panel, a meter, a valve, a solenoid, an actuator or a servo.

When computer system 1000 is a mobile computing device, input device 1014 can comprise a global positioning system (GPS) receiver coupled to a GPS module that is capable of triangulating to a plurality of GPS satellites, determining and generating geo-location or position data such as latitude-longitude values for a geophysical location of the computer system 1000. Output device 1012 can include hardware, software, firmware, and interfaces for generating position reporting packets, notifications, pulse or heartbeat signals, or other recurring data transmissions that specify a position of the computer system 1000, alone or in combination with other application-specific data, directed toward host computer 1024 or server 1030.

Computer system 1000 can implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1000 in response to processor 1004 executing at least one sequence of at least one instruction contained in main memory 1006. Such instructions can be read into main memory 1006 from another storage medium, such as storage 1010. Execution of the sequences of instructions contained in main memory 1006 causes processor 1004 to perform the process steps described herein. In alternative embodiments, hard-wired circuitry can be used in place of or in combination with software instructions.

The term "storage media" as used herein refers to any non-transitory media that store data and/or instructions that cause a machine to operate in a specific fashion. Such storage media can comprise non-volatile media and/or volatile media. Non-volatile media includes, for example, optical or magnetic disks, such as storage 1010. Volatile media includes dynamic memory, such as memory 1006. Common forms of storage media include, for example, a hard disk, solid state drive, flash drive, magnetic data storage medium, any optical or physical data storage medium, memory chip, or the like.

Storage media is distinct from but can be used in conjunction with transmission media. Transmission media participates in transferring information between storage media. For example, transmission media includes coaxial cables, copper wire and fiber optics, including the wires that comprise a bus of I/O subsystem 1002. Transmission media can also take the form of acoustic or light waves, such as those generated during radio-wave and infra-red data communications.

Various forms of media can be involved in carrying at least one sequence of at least one instruction to processor 1004 for execution. For example, the instructions can initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1000 can receive the data on the communication link and convert the data to be read by computer system 1000. For instance, a receiver such as a radio frequency antenna or an infrared detector can receive the data carried in a wireless or optical signal and appropriate circuitry can provide the data to I/O subsystem 1002 such as place the data on a bus. I/O subsystem 1002 carries the data to memory 1006, from which processor 1004 retrieves and executes the instructions. The instructions received by memory 1006 can optionally be stored on storage 1010 either before or after execution by processor 1004.

Computer system 1000 also includes a communication interface 1018 coupled to I/O subsystem 1002. Communication interface 1018 provides a two-way data communication coupling to network link(s) 1020 that are directly or indirectly connected to at least one communication network, such as a network 1022 or a public or private cloud on the Internet. For example, communication interface 1018 can be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1022 broadly represents a LAN, WAN, campus network, internetwork, or any combination thereof. Communication interface 1018 can comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1018 sends and receives electrical, electromagnetic, or optical signals over signal paths that carry digital data streams representing various types of information.

Computer system 1000 can also include a timer 1032. The processor 1004 can initiate the timer 1032 to expire after an interval of time (e.g., 1 second, 1 minute, 10 minutes, etc.). In some embodiments, the processor 1004 received an interrupt upon expiration of the timer 1032. The processor 1004 can, for instance, execute an interrupt service routine (ISR) in response to the interrupt. In some embodiments, the interrupt signals to the processor 1004 that a task has failed to complete execution within a time interval that the timer 1032 was initiated with.

Network link 1020 typically provides electrical, electromagnetic, or optical data communication directly or through at least one network to other data devices, using, for example, satellite, cellular, Wi-Fi, or BLUETOOTH technology. For example, network link 1020 can provide a connection through a network 1022 to a host computer 1024.

Furthermore, network link 1020 can provide a connection through network 1022 or to other computing devices via internetworking devices and/or computers that are operated by an Internet Service Provider (ISP) 1026. ISP 1026 provides data communication services through a world-wide packet data communication network represented as internet 1028. A server 1030 can be coupled to internet 1028. Server 1030 broadly represents any computer, data center, virtual machine, or virtual computing instance with or without a hypervisor, or computer executing a containerized program system such as DOCKER or KUBERNETES. Server 1030 can represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 1000 and server 1030 can form elements of a distributed computing system that includes other computers, a processing cluster, server farm or other organization of computers that cooperate to perform tasks or execute applications or services. Server 1030 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 1030 can comprise a web application server that hosts a presentation layer, application layer and data storage layer such as a relational database system using structured query language (SQL) or NoSQL, an object store, a graph database, a flat file system or other data storage.

Computer system 1000 can send messages and receive data and instructions, including program code, through the network(s), network link 1020 and communication interface 1018. In the Internet example, a server 1030 might transmit a requested code for an application program through Internet 1028, ISP 1026, local network 1022 and communication interface 1018. The received code can be executed by processor 1004 as it is received, and/or stored in storage 1010, or other non-volatile storage for later execution.

The execution of instructions as described in this section can implement a process in the form of an instance of a computer program that is being executed, and consisting of program code and its current activity. Depending on the operating system (OS), a process can be made up of multiple threads of execution that execute instructions concurrently. In this context, a computer program is a passive collection of instructions, while a process can be the actual execution of those instructions. Several processes can be associated with the same program; for example, opening up several instances of the same program often means more than one process is being executed. Multitasking can be implemented to allow multiple processes to share processor 1004. While each processor 1004 or core of the processor executes a single task at a time, computer system 1000 can be programmed to implement multitasking to allow each processor to switch between tasks that are being executed without having to wait for each task to finish. In an embodiment, switches can be performed when tasks perform input/output operations, when a task indicates that it can be switched, or on hardware interrupts. Time-sharing can be implemented to allow fast response for interactive user applications by rapidly performing context switches to provide the appearance of concurrent execution of multiple processes simultaneously. In an embodiment, for security and reliability, an operating system can prevent direct communication between independent processes, providing strictly mediated and controlled inter-process communication functionality.

6. Extensions and Alternatives

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A method of categorizing and processing user queries related to a computing environment using artificial intelligence, comprising:
   receiving a user query associated with a user account;
   transmitting an initial prompt to a first large language model (LLM) to identify one or more types of the user query from a plurality of types, the plurality of types including:
   an information type,
   a transaction type, and
   an action type;
   based on identifying the information type:
      determining context information corresponding to a set of documents for the user query;
      generating an information type prompt including the context information;
      transmitting the information type prompt to a second LLM to generate first content; and
      transmitting a first response to the user query based on the first content;
   based on identifying the transaction type:
      generating a database query from the user query;
      executing the database query to retrieve second content; and
      transmitting a second response to the user query based on the second content;
   based on identifying the action type:
      determining an action associated with the user query that changes a data value or an application status in the computing environment;
      confirming that the user account has permissions to perform the action;
      making a call to an internal application programming interface (API) to perform the action; and
      transmitting a third response to the user query based on a result of performing the action,
   wherein the method is performed by one or more processors.

2. The method of claim 1, further comprising:
   generating interactive content based on the second content, the interactive content configured to submit pre-populated additional user queries.

3. The method of claim 1, wherein executing the database query to retrieve the second content further includes:
   verifying interface access rights associated with the user query.

4. The method of claim 1, wherein identifying the type of the user query from the plurality of types further includes:
   receiving a plurality of intent identifiers; and
   identifying the type of the user query based on a determined association between a respective type of the plurality of types and one or more intent identifiers of the plurality of intent identifiers.

5. The method of claim 1, wherein:
   executing the database query to retrieve the second content further includes transmitting read interface access rights associated with the user query; and
   making the call to the internal API to perform the action further includes transmitting write interface access rights associated with the user query.

6. The method of claim 1, further comprising:
   removing an access rights record from the user query, producing a trimmed user query;
   wherein:
   the initial prompt is produced based upon the trimmed user query.

7. The method of claim 1, further comprising:
   encoding a textual portion of the user query as a query vector;
   performing a semantic search of a query cache using the query vector; and
   based on receiving a query hit from the query cache, transmitting the first response to the user query based on a stored summary of the query hit.

8. The method of claim 1, further comprising:
   encoding a textual portion of the user query as a query vector;
   performing a semantic search of a query cache using the query vector;
   based on receiving a query miss from the query cache, performing a similarity search of a vector database;
   enriching the user query with historical records from a conversation history associated with the user account; and
   transmitting one or more relevant vectors from the vector database and one or more historical records from the historical records to the second LLM.

9. The method of claim 1, wherein the second response includes a status of a server.

10. The method of claim 1, wherein the action includes an instruction to update a configuration of a server.

11. The method of claim 1, further comprising:
    splitting a textual portion of the user query into a scope portion and a substance portion; and
    wherein identifying the type of the user query from the plurality of types is based upon the scope portion, and excludes identifying based upon the substance portion.

12. The method of claim 1, further comprising:
    based on identifying the transaction type:
       generating the information type prompt including the context information, the context information including a database schema;
       transmitting the information type prompt to the second LLM to generate a summary of the context information; and
       invoking a transaction call to the internal API to retrieve content, the transaction call including a database query based upon the summary of the context information.

13. The method of claim 1, further comprising:
based on identifying the action type:
generating the information type prompt including context information, the context information including an API specification including one or more call definitions of the internal API;
transmitting the information type prompt to the second LLM to generate a summary of the context information; and
making the call to the internal API to perform the action, the call including an message formatted according to a selected call definition from the summary of the context information.

14. A non-transitory, computer-readable storage medium storing one or more sequences of instructions which when executed cause one or more processor to perform:
receiving a user query associated with a user account;
transmitting an initial prompt to a first large language model (LLM) to identify one or more types of the user query from a plurality of types, the plurality of types including:
an information type,
a transaction type, and
an action type;
based on identifying the information type:
determining context information corresponding to a set of documents for the user query;
generating an information type prompt including the context information;
transmitting the information type prompt to a second LLM to generate first content; and
transmitting a first response to the user query based on the first content;
based on identifying the transaction type:
generating a database query from the user query;
executing the database query to retrieve second content;
and
transmitting a second response to the user query based on the second content;
based on identifying the action type:
determining an action associated with the user query that changes a data value or an application status in a computing environment;
confirming that the user account has permissions to perform the action;
making a call to an internal application programming interface (API) to perform the action;
and
transmitting a third response to the user query based on a result of performing the action.

15. The non-transitory, computer-readable storage medium of claim 14, the one or more sequences of instructions when executed causing the one or more processor to further perform:
generating interactive content based on the second content, the interactive content configured to submit pre-populated additional user queries.

16. The non-transitory, computer-readable storage medium of claim 14, wherein executing the database query to retrieve the second content further includes:
verifying interface access rights associated with the user query.

17. The non-transitory, computer-readable storage medium of claim 14, wherein identifying the type of the user query from the plurality of types further includes:
receiving a plurality of intent identifiers; and
identifying the type of the user query based on a determined association between a respective type of the plurality of types and one or more intent identifiers of the plurality of intent identifiers.

18. The non-transitory, computer-readable storage medium of claim 14, wherein:
executing the database query to retrieve the second content further includes transmitting read interface access rights associated with the user query; and
making the call to the internal API to perform the action further includes transmitting write interface access rights associated with the user query.

19. The non-transitory, computer-readable storage medium of claim 14, the one or more sequences of instructions when executed causing the one or more processor to further perform:
encoding a textual portion of the user query as a query vector;
performing a semantic search of a query cache using the query vector; and
based on receiving a query hit from the query cache, transmitting the first response to the user query based on a stored summary of the query hit.

20. A system, comprising:
a memory;
one or more processors coupled to the memory and configured to perform:
receiving a user query from the client device associated with a user account, at the automation orchestration device;
transmitting an initial prompt from the automation orchestration device to a first large language model (LLM) at the language processing device to identify one or more types of the user query from a plurality of types, the plurality of types including:
an information type,
a transaction type, and
an action type;
based on identifying the information type:
determining context information corresponding to a set of documents for the user query at the caching and query augmentation device;
generating an information type prompt including the context information;
transmitting the information type prompt to a second LLM at the language processing device to generate first content; and
transmitting to the client device a first response to the user query based on the first content;
based on identifying the transaction type:
generating a database query from the user query;
executing the database query at the internal application server to retrieve second content;
and
transmitting to the client device a second response to the user query based on the second content;
based on identifying the action type:
determining an action associated with the user query that changes a data value or an application status in the internal application server;
confirming that the user account has permissions at the internal application server to perform the action;
making a call to an internal application programming interface (API) at the internal application server to perform the action;
and transmitting to the client device a third response to the user query based on a result of performing the action.

* * * * *